(12) United States Patent
Thom

(10) Patent No.: US 9,349,299 B1
(45) Date of Patent: May 24, 2016

(54) TECHNOLOGIES FOR STUDENTS EVALUATING TEACHERS

(71) Applicant: Sean Thom, Milville, NJ (US)

(72) Inventor: Sean Thom, Milville, NJ (US)

(*) Notice: Subject to any disclaimer, the term of this patent is extended or adjusted under 35 U.S.C. 154(b) by 253 days.

(21) Appl. No.: 13/928,612

(22) Filed: Jun. 27, 2013

Related U.S. Application Data (60) Provisional application No. 61/676,433, filed on Jul. 27, 2012.

(51) Int. Cl.
| | | |
|---|---|---|
| G06F 17/00 | (2006.01) |
| G09B 7/00 | (2006.01) |
| G09B 7/02 | (2006.01) |
| G09B 7/04 | (2006.01) |
| G06Q 50/20 | (2012.01) |
| G09B 5/00 | (2006.01) |

(52) U.S. Cl.
CPC *G09B 7/00* (2013.01); *G06Q 50/20* (2013.01); *G09B 7/02* (2013.01); *G09B 7/04* (2013.01); *G09B 5/00* (2013.01)

(58) Field of Classification Search
CPC .............. G09B 7/00; G09B 7/02; G09B 7/04; G06Q 50/20
See application file for complete search history.

(56) References Cited

U.S. PATENT DOCUMENTS

| | | |
|---|---|---|
| 5,978,648 A | 11/1999 | George et al. |
| 2001/0031456 A1 | 10/2001 | Cynaumon et al. |
| 2002/0194100 A1 | 12/2002 | Choban et al. |
| 2006/0147890 A1 | 7/2006 | Bradford et al. |
| 2006/0172274 A1 | 8/2006 | Nolasco |
| 2007/0020604 A1* | 1/2007 | Chulet ............... G09B 7/02 434/350 |
| 2009/0287738 A1* | 11/2009 | Colbran .............. G06Q 50/20 |
| 2010/0062411 A1 | 3/2010 | Bartholomew |
| 2010/0268686 A1 | 10/2010 | Germany, II |
| 2011/0256521 A1 | 10/2011 | Mansfield et al. |
| 2012/0231437 A1* | 9/2012 | Fakhrai .............. G09B 7/00 434/350 |

* cited by examiner

*Primary Examiner* — Nathan Hillery
(74) *Attorney, Agent, or Firm* — Dentons US LLP (57) ABSTRACT

A technology is provided. The technology enables availing a plurality of educational standards to a plurality of students. The standards are for a plurality of lessons to be at least partially taught via a plurality of teachers to the students. The technology further enables receiving a plurality of ratings from the students. The ratings rating the teachers based at least in part on the students perceptions of the teachers at least partially teaching the lessons according to the standards. The technology also enables extracting a meaning from the ratings.

12 Claims, 7 Drawing Sheets

TECHNOLOGIES FOR STUDENTS EVALUATING TEACHERS

CROSS-REFERENCE TO RELATED APPLICATIONS

The present application claims priority to U.S. Provisional Patent Application Ser. No. 61/676,433, filed on Jul. 27, 2012, which is herein incorporated by reference in its entirety for all purposes.

TECHNICAL FIELD

Generally, the present disclosure relates to computing. More particularly, the present disclosure relates to education.

BACKGROUND

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

Schools, such as preschools, primary schools or secondary schools, employ teachers to educate students. Such education typically occurs on school premises, such as classrooms, during predefined time periods throughout a school day. Usually, the students stay in the classrooms for durations of the time periods and the teachers lecture the students on various topics during those time periods. In order to ensure focused and effective lectures, many of the teachers use lesson plans, which are usually created before the lectures via the teachers or other people.

Most school supervisors and/or parents of the students desire that some minimum predefined standards of education be followed in the schools. Resultantly, the supervisors, educational organizations and/or governmental bodies facilitate development and/or actually develop such standards and direct the teachers to follow these standards when teaching. Consequently, when the teachers utilize the lesson plans for teaching, then such directives guide the use of the lessons plans in the classrooms.

Many of the teachers who use the lesson plans usually abide by such directives and teach according to the standards. However, some of the teachers who use the lesson plans, avoid abiding to such directives and do not teach according to the standards. Thus, when their students take standardized tests, which often test according to the standards, then such students can receive low scores, which are typically undesirable.

While certain aspects of conventional technologies have been discussed to facilitate the present disclosure, no technical aspects are disclaimed. The claims may encompass at least one of the conventional technical aspects discussed herein.

BRIEF SUMMARY

The present disclosure addresses at least one of the above. However, the present disclosure may prove useful in addressing other problems and deficiencies in a number of technical areas. Therefore, the claims, as recited below, should not necessarily be construed as limited to addressing any of the particular problems or deficiencies discussed herein.

According to an example embodiment of the present disclosure a method is provided. The method includes at least partially facilitating via a processor of availing a plurality of educational standards to a plurality of students. The standards are for a plurality of lessons to be at least partially taught via a plurality of teachers to the students. The method further includes at least partially facilitating via the processor of receiving a plurality of ratings from the students. The ratings rating the teachers based at least in part on the students perceptions of the teachers at least partially teaching the lessons according to the standards. The method also includes at least partially facilitating via the processor of extracting a meaning from the ratings.

According to an example embodiment of the present disclosure a non-transitory computer-readable storage medium is provided. The medium includes a plurality of computer readable instructions which, when executed via a processor, instruct the processor to facilitate performance of a method. The method includes availing a plurality of educational standards to a plurality of students. The standards are for a plurality of lessons to be at least partially taught via a plurality of teachers to the students. The method further includes receiving a plurality of ratings from the students. The ratings rating the teachers based at least in part on the students perceptions of the teachers at least partially teaching the lessons according to the standards. The method also includes extracting a meaning from the ratings.

According to an example embodiment of the present disclosure a system is provided. The system includes a processor and an application configured to execute via the processor. The application facilitating an implementation of a method. The method includes availing a plurality of educational standards to a plurality of students. The standards are for a plurality of lessons to be at least partially taught via a plurality of teachers to the students. The method further includes receiving a plurality of ratings from the students. The ratings rating the teachers based at least in part on the students perceptions of the teachers at least partially teaching the lessons according to the standards. The method also includes extracting a meaning from the ratings.

The present disclosure may be embodied in the form illustrated in the accompanying drawings. Attention is called to the fact, however, that the drawings are illustrative. Variations are contemplated as being part of the disclosure, limited only by the scope of the claims. The above and other features, aspects and advantages of the present disclosure will become better understood to one skilled in the art with reference to the following drawings, detailed description and appended claims.

BRIEF DESCRIPTION OF THE DRAWINGS

The accompanying drawings, which are incorporated into and form a part of the specification, illustrate example embodiments of the present disclosure. Together with the detailed description, the drawings serve to explain the principles of the present disclosure. The drawings are only for the purpose of illustrating example embodiments of the present disclosure and are not to be construed as necessarily limiting the disclosure. Like numbers can refer to like elements throughout. The above and other aspects, advantages and features of the present disclosure will become better understood to one skilled in the art with regard to the following description, appended claims and accompanying drawings where:

DETAILED DESCRIPTION OF THE PREFERRED EMBODIMENTS

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner, irrespective of the at least one entity have any relationship to education.

The terminology used herein can imply direct or indirect, full or partial, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Figure 1:
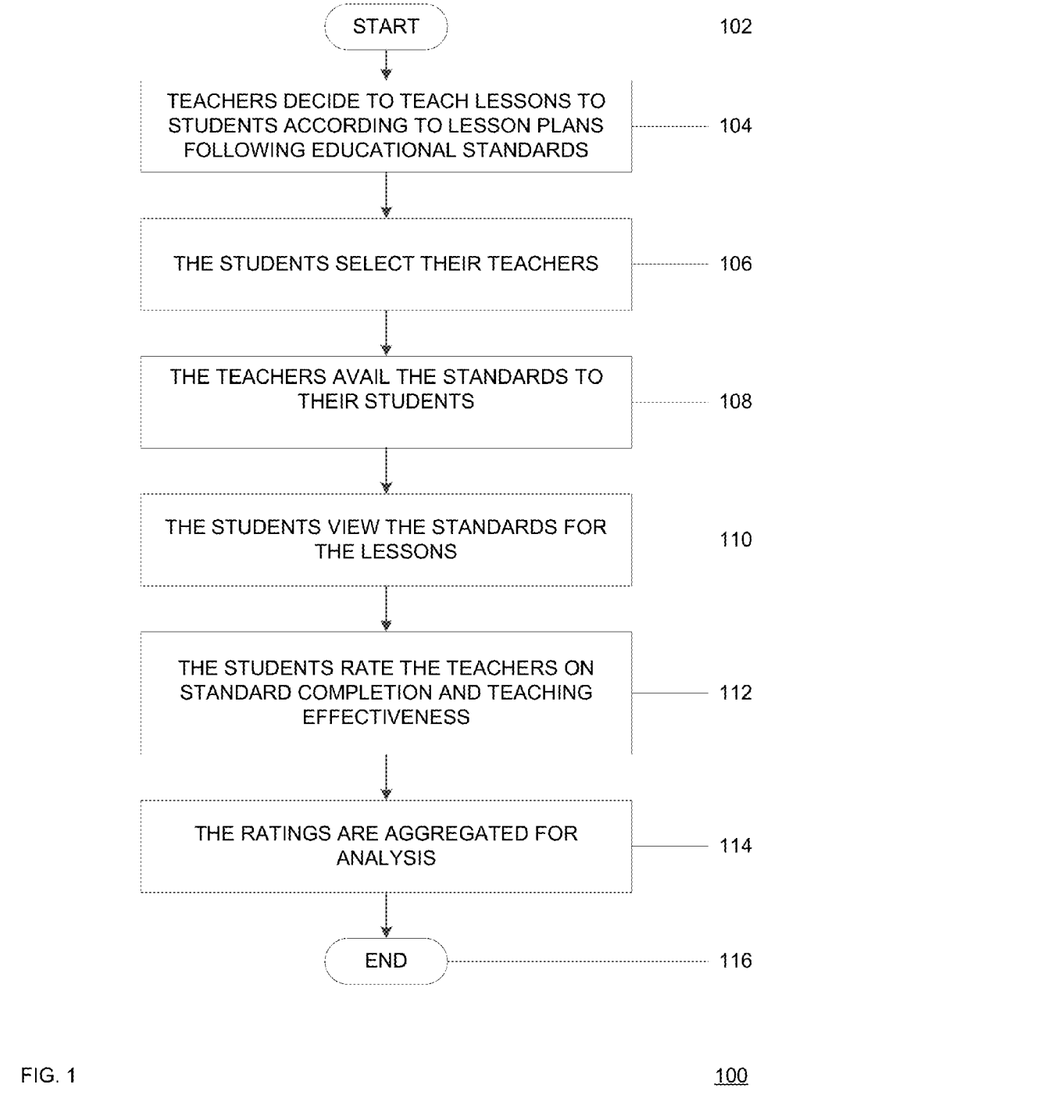
FIG. 1 shows a flowchart of an example embodiment of a process for evaluating teachers according to the present disclosure.

FIG. 1 shows a flowchart of an example embodiment of a process for evaluating teachers according to the present disclosure. A process 100 includes blocks 102-116. Any portion of process 100 can be performed on any time period or lesson basis, such as per lesson, daily, weekly and so forth.

In block 102, process 100 starts.

In block 104, teachers decide to teach lessons to students according to lesson plans following educational standards. Alternatively, the plans each can follow one standard. The teachers can be any human teachers for any subjects, such as math, history, science and so forth. The lessons can be taught simultaneously and/or at different time periods. The plans are detailed descriptions of the lessons for particular subjects. The plans are for specific grade levels, however, in other example embodiments, the plans are for non-specific grade levels. The plans can include at least one of a title of the lesson, a time required to complete the lesson, a list of required materials, a list of objectives, whether behavioral objectives or knowledge objectives, a set that focuses students on the lesson's skills or concepts, an instructional component, an independent practice component, a summary, a subject matter evaluation component and a teacher analysis component that the teacher can use for teaching self-reflection. The plans can be for whole-class, small groups, workshops, independent work, peer learning or contractual purposes. The plans can include components, which can be viewed as educational objectives for students to learn upon conclusion of the lessons. Alternatively, the components define the plans. The components can be the standards. The plans follow a predefined standard of education, such as a list of educational topics/concepts/ideas, as disclosed by a supervisor, an educational organization and/or a governmental body, such as a board or a department of education, whether on municipal, local, state or federal level. The plans can be written by the teachers themselves or obtained by the teachers from various sources, such as other teachers, governmental bodies, supervisors, websites, books, magazines, newsletters and the like.

The standard can include time data, such as timing of learning of different topics/concepts/ideas, and/or other educational standard relevant information. The standard can be focused on topic literacy. The standard can outline what a student needs to know, understand and be able to do. The standard can be developmentally appropriate and/or student achievable in a reasonable manner. The standard can be specific, concrete and/or measurable. The standard can be developed via any party/entity as disclosed herein.

In block 106, the students select their teachers. The students arrive for classes given by their teachers and, using mobile computing devices, such as a laptop, a smartphone or a tablet computer, access a computer system. Then, via the system, the students select their teachers in order to view the standards of the selected teachers for their classes. For example, where a teacher A teaches a class B in a classroom C and a student D is assigned to class B, then student D can enter classroom C, access the system and select teacher A from a menu provided by the system. The accessing of the system can be done via a website through a browser, a software application or via initializing a mobile app, as freely available or purchased via an online app store, on a smartphone or a tablet computer. Alternatively, desktops can be used as well. Also alternatively, the accessing of the system can occur outside of the classroom as well, whether on or off school premises. Note that although teacher selection is described, other forms of teacher input are included as well, such as a text box and so forth.

In block 108, the teachers avail the standards to their students. The teachers can teach many classes of students. Thus, each teacher can avail his/her standards to the students of the teacher's class. For example, if teacher A teaches science in class B, then teacher A can avail the standards to class B. Similarly, if teacher A teaches science on similar comprehension or grade level as in classes B and C, then teacher A can avail the standards to classes B and C. Likewise, if teacher A teaches science in class B and math in class C, then teacher A can avail one standard to class A and another standard to class B. Resultantly, correspondence between teachers and classrooms or students can be one-to-one, one-to-many, many-to-many and many-to-one. The students can be of any age, learning ability, grade or any permutations thereof. Also, the students can be undergraduate or graduate students or any permutations thereof. Additionally, the teacher can avail multiple standards following the same lesson plan to one class where each standard corresponds to a different set of students in the same class. Note that the standards can be availed, provided and/or presented to the students in their original text and/or format, and/or amended for student comprehension, such as abridged, rewritten, reformatted, outlined, graphically presented, pictographic, symbolized and so forth. Such amendment can be performed via at least one entity as disclosed herein.

The teachers can avail the standards in multiple ways. For example, a teacher can create a lesson plan following some standards on a personal, public or work computer, access the computer system to upload the created standards and avail the standards to a class or a group of students through sharing via the system. Alternatively, the teacher can obtain the plan from another source, such as a website, access the system to upload the standards to the system and avail the standards to a class or a group of students through sharing via the system. Also alternatively, the teacher can access the system, design the plan on the system and avail the standards to a class or a group of students through sharing via the system. The sharing can be any form of access control granted to at least one student of the teacher to at least view at least a portion of the standard. Some examples of the sharing include email, text messaging, social network sharing, a web interface, inter-app sharing and so forth.

In block 110, the students view the standards for the lessons. Upon the students selecting their teachers, the system displays the standard corresponding to the lessons to be taught by the teachers. The students view the standard as availed by the teachers. For each student, at least one portion of the standard is viewed. In some embodiments, the students do not actually see the lesson plan. Rather, the students see the standards that will be taught according to by the teacher.

In block 112, the students rate the teachers on standard completion and teaching effectiveness of the standards. Whether initiated by the teachers, such as upon completion of the class, the system, such as via a class end as programmed in the system via a predefined class schedule, or the students, such as via accessing the system, the system displays a rating system, such as a rating scale, a Likert scale, a 1-10 scale, a color scale, a questionnaire, a bubble form, a slider scale or any other functional equivalents thereof. The rating system allows for the students to rate the teachers for teaching according to the standards corresponding to the classes, as actually taught by the teachers. Although the system can employ one type of rating system, any permutations of different rating systems can also be used for different classes, teachers or students.

The rating is performed on standard completion, such as whether a teacher actually taught according to standard, as availed to and viewed by the students. The rating is also performed on teaching effectiveness of the standards, such as how effective was the teacher's presentation in actual teaching of the standards and conveying educational concepts relating to the standard. For example, when the rating system is a Likert scale, then the students can be presented with choices, such as "The teacher covered all standards," "The teacher covered some of the standards," "The teacher did not cover any of the standards" and "The teacher covered all standards, but I am still unclear about some of the standards." Also for example, when the rating system is a Likert scale, then the students can be presented with choices for each standard, such as "The teacher covered this standard," "The teacher partially covered this standard," "The teacher did not cover this standard" and "The teacher covered this standard, but I am still unclear about this standard." Another example choice that can be presented is "I choose not to learn today." Other types of questions and items can also be used in order to elicit students' responses as to rating the teachers on standard completion and teaching effectiveness of the standards.

Upon the students rating the teachers on standard completion and teaching effectiveness of the standards, the students submit their rating to the system. The submission can be per individual standard and/or for all standards together. The submission can occur automatically, such as when a student completes the rating, or manually, such as when a student activates a graphical user interface (GUI) element, like a button, to submit the rating. Also, the students can leave comments with the ratings, whether for one or all standards.

In block 114, the ratings are aggregated for analysis. Although the system can store the ratings, in other example embodiments, the ratings can be stored in other computer systems. Via the system or other computer systems, various data analysis operations can be performed in order to extract meanings from the ratings. The meanings can relate to teacher evaluation or student participation or performance. The ratings, whether individually or collectively, are available to the teachers or the schools' administration, such as supervisors, principals, assistant principals and/or other administrative staff, in an attempt to gauge the standard completion and the teaching effectiveness of the standards in terms of students' learning. In order to encourage honesty regarding students' learning, the ratings are anonymous to the teachers. However, the ratings are not anonymous to the administration in order to discourage inappropriate ratings and to address any issues that may arise from the ratings. Also, when the students leave comments with the ratings, whether for one or all standards, the schools' administration can view the comments. In another example embodiment, the teacher can see the comments.

When a student rates a teacher such that the student indicates that the teacher covered some or all standards, as availed, but the student is still unclear about at least some of the standards and/or the teacher covered a specific standard, but the student is still unclear about the specific standard, then that rating is not anonymous to the teacher. In such scenario, a communication, such as an email, a text message, an app message and so forth, is automatically generated, via the system, and communicated to the teacher in order to inform the teacher that the student needs additional help regarding a certain standard or all standards, as availed. The communication allows the teacher to review or spend extra time with that student regarding that standard or all standards. Such communications can be communicated to any or all teachers, the supervisors or the administration for any or all students for any or all classes.

In block 116, process 100 ends.

Accordingly, process 100 can allow the students to be responsible and have an idea as to what educational subject matter the students need to master to be proficient as per supervisor and/or governmental standards. Moreover, process 100 can make education more student-centered thereby making students responsible for their own learning. Furthermore, process 100 can also allow for benchmarking school administrators, teachers and students see what the students have learned and mastered and what other materials the teachers need to cover and in what manner. Additionally, process 100 can serve as a means in which to evaluate the teachers when administrators are not actually in the classrooms since information and feedback that the students provide about the manner in which the standards are or are not covered can prove to be vital when evaluating the effectiveness of the teachers. In addition, process 100 can be used for intervention thereby allowing the administrators to monitor the teachers' progress based on the opinions of their students. For example, if an administrator sees a particular issue from the rating, the administrator can analyze the data based on a lesson, hourly, daily, weekly, monthly, mid-marking period, marking period, semester or yearly basis. Also, the administrator can utilize such data to notice when a teacher might need additional help in reaching their students in regards to the standards and can as a result increase further observations or even professional improvement plans if need be. Moreover, process 100 can serve as a tool in which to interpret student mastery of state standards, which can result in higher standardized test scores. Further, process 100 can allow the administrators, who use the system, to get a better grasp of what standards the teachers are actually teaching in their classrooms and to what extent the teachers are doing such. Additionally, process 100 can result in higher test scores on standardized testing as well as provide increased accountability for teachers. For example, if a teacher teaches a group of students and the group scores poorly on testing, yet data, such as analyzed ratings, indicates that the teacher has covered the tested material satisfactorily, then there may be a different cause, theory or explanation for the low scores. Further, process 100 can allow the administration to benchmark teachers against each other in performance as well as against national, state and local standards. Moreover, process 100 can be performed in real-time.

In another example embodiment, when the schools or the students lack financial resources to employ process 100, lack computing devices for using process 100 or lack access to networks, such as Internet, to use process 100, then teachers can provide the students with sheets, such as machine-readable papers on which students mark answers to multiple-choice questions. When those sheets are collected, the sheets can be read by machines that use image-based data collection software and scanners. Such results can maintain anonymity, such as when identifying information other than names is used.

Figure 2:
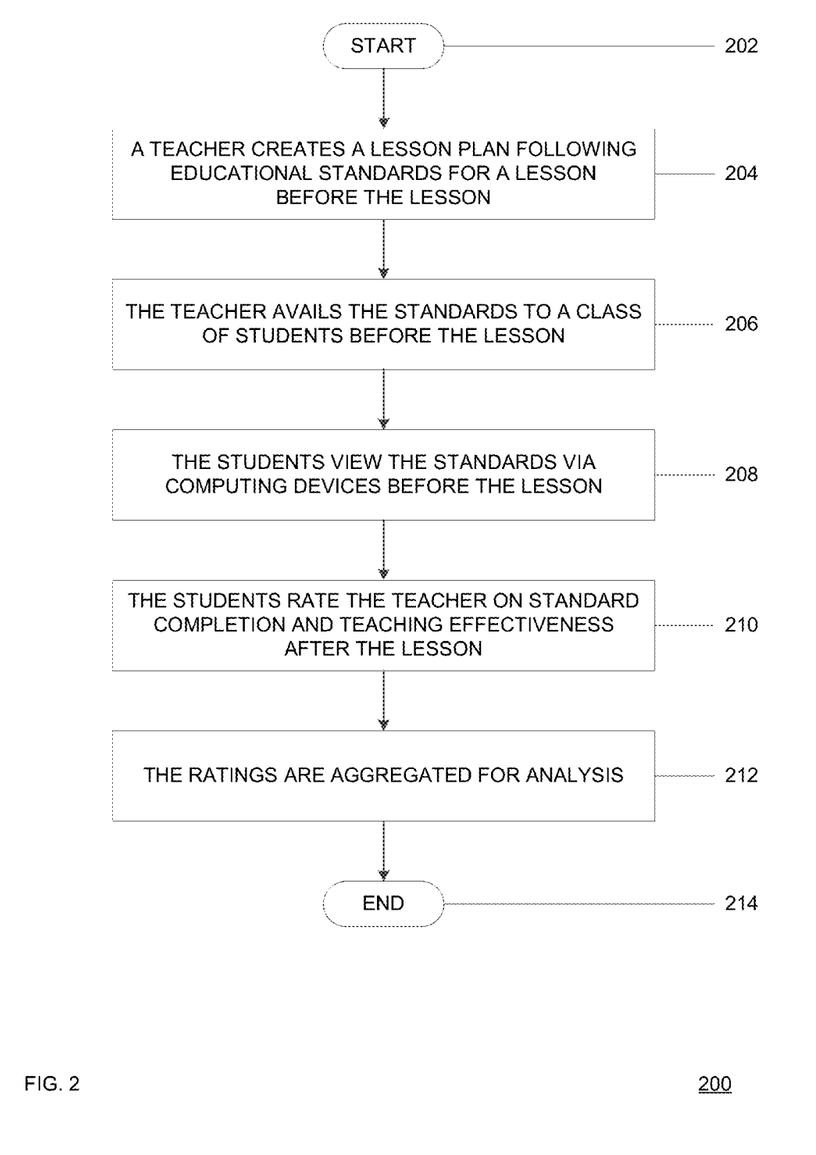
FIG. 2 shows a flowchart of an example embodiment of a process for evaluating a teacher according to the present disclosure.

FIG. 2 shows a flowchart of an example embodiment of a process for evaluating a teacher according to the present disclosure. A process 200 includes blocks 202-214. Any portion of process 200 can be performed on any time period or lesson basis, such as per lesson, daily, weekly and the like.

In block 202, a teacher creates a lesson plan for the lesson following educational standards before the lesson. Alternatively, the standards define the plan. The teacher creates the plan as per governmental educational standards for a specific class and subject. The standards can be part of the plan or be separately created or matched to the plan, whether in the same file or a different file. The standards can be readily available to the teacher, whether from public or private information, or created by the teacher. The teacher can create the plan on a personal or work computer, access a computer system, which can include a server operably coupled to a database, and upload the plan and/or the standards to the system. The server can host or be operably coupled to a website. Alternatively, the teacher can obtain the plan from another source, such as a website, a book, a magazine, another teacher or use the plan from last year or another class, access the system and upload the plan and/or the standards to the system. Also alternatively, the teacher can access the system and create the plan and/or the standards via the system.

In block 206, the teacher avails the standards to a class of students before the lesson. The teacher can avail the standards in multiple ways. For example, a teacher can create a lesson plan on a personal or work computer, access a computer system to upload the created plan and avail the standards to a class or a group of students through sharing via the system when the students previously disclosed at least one manner of sharing that the students prefer. Alternatively, the teacher can obtain the lesson from another source, such as a website, access the system to upload the plan to the system and avail the standards to a class or a group of students through sharing via the system. Also alternatively, the teacher can access the system, design a lesson plan on the system and avail the standards to a class or a group of students through sharing via the system. The sharing can be any form of access control granted to at least one student of the teacher to at least view a portion of one of the standards. Some examples of the sharing include email, text messaging, social network sharing, inter-app sharing and the like.

In block 208, the students view the standards via computing devices before the lesson. The teacher can describe the lesson plan for the day and then the students can view the standards. In order to view the standards when multiple teachers teach the students, the system allows for the students to access the system. The students can search for the teacher, input the teacher's name or select the teacher from a list of the multiple teachers, as displayed on the computing devices, and view the standards. Alternatively, upon accessing, the system automatically selects the teacher based on each of the students' schedules, as stored in the system. Also alternatively, when the computing devices are mobile and equipped with positioning technology, such as global positioning system (GPS), signal triangulation and so forth, then upon accessing, the system can automatically select the teacher based on classroom positioning data, as stored in the system, which can be matched to the teacher's mobile device if the teacher position is available via the device. The computing devices can be mobile, such as laptops, tablet computers or mobile phones, or stationary, such as desktop computers. For example, where a teacher A teaches a class B in a classroom C and a student D is assigned to class B, then student D can enter classroom C, access the system and select teacher A from a menu. The accessing of the system can be done via a website through a browser or via initializing a mobile app, as freely available or purchased via an online app store, on a smartphone or a tablet computer. Alternatively, the accessing of the system can occur outside of the classroom as well, whether on or off school premises. The viewing can be of one or all of the standards.

In block 210, the students rate the teacher on standard completion and teaching effectiveness of the standards after the lesson. Whether initiated by the teacher, such as upon completion of the class, the system, such as via a class end as programmed in the system via a predefined class schedule, or the students, such as via accessing the system, the system displays a rating system, such as a rating scale, a Likert scale, a 1-10 scale, a color scale, a questionnaire, a bubble form, a slider scale or any other functional equivalents thereof. The rating system allows for the students to rate the teacher for teaching according to the standards corresponding to the classes, as actually taught by the teacher. The standards can be visible during the rating. Although the system can employ one type of rating system, any permutations of different rating systems can also be used for different classes, teachers or students.

The rating is performed on standard completion, such as whether a teacher actually taught according to the standards, as availed to and viewed by the students. The rating is also performed on teaching effectiveness of the standards, such as how effective was the teacher's presentation in actual teaching of the standards and conveying educational concepts relating to the standards. For example, when the rating system is a Likert scale, then the students can be presented with choices, such as "The teacher covered all standards", "The teacher covered some of the standards," "The teacher did not cover any of the standards" and "The teacher covered all standards, but I am still unclear about some of the standards." Also for example, when the rating system is a Likert scale, then the students can be presented with choices for each standard, such as "The teacher covered this standard," "The teacher partially covered this standard," "The teacher did not cover this standard" and "The teacher covered this standard, but I am still unclear about this standard." Another example choice that can be presented is "I choose not to learn today." Other types of questions and items can also be used in order to elicit the students' responses as to rating the teacher on standard completion and teaching effectiveness of the standards. For example, a choice presented to a student can be "Mr. X taught addition well."

Upon the students rating the teacher on standard completion and teaching effectiveness of the standards, the students submit their rating to the system. The submission can occur automatically, such as when a student completes the rating, or manually, such as when a student activates a GUI element, like a button or a hyperlink, to submit the rating. Also, the students can leave comments with the ratings, whether for one or all standards.

In block 212, the ratings are aggregated for analysis. The system stores the ratings. Via the system or other computer systems, various data analysis operations can be performed in order to extract meanings from the ratings. The meanings can relate to the teacher's evaluation or student performance. The ratings, whether individually or collectively, are available to the teacher or the schools' administration, such as supervisors, principals or assistant principals, in an attempt to gauge the standard completion and the teaching effectiveness of the standards in terms of students' learning. Alternatively, the ratings can be available to other entities, such as boards of education.

In order to encourage honesty regarding students' learning, the ratings are anonymous to the teacher. However, the ratings are not anonymous to the administration in order to discourage inappropriate ratings and to address any issues that may arise from the ratings. Also, when the students leave comments with the ratings, whether for one or all standards, the schools' administration can view the comments.

When a student rates one or all standards such that the student indicates that the teacher covered all standards, but the student is still unclear about some of the standards or the teacher covered a specific standard, but the student is still unclear about the specific standard, then that rating is not anonymous to the teacher. In such scenario, a communication, such as an email, a text message, an app message and the like, will be automatically generated, via the system, and communicated to the teacher in order to inform the teacher that the student needs additional help regarding a certain standard or all standards. The communication allows the teacher to review or spend extra time with that student regarding that standard or all standards, for that lesson.

In block 214, process 200 ends.

Figure 3:
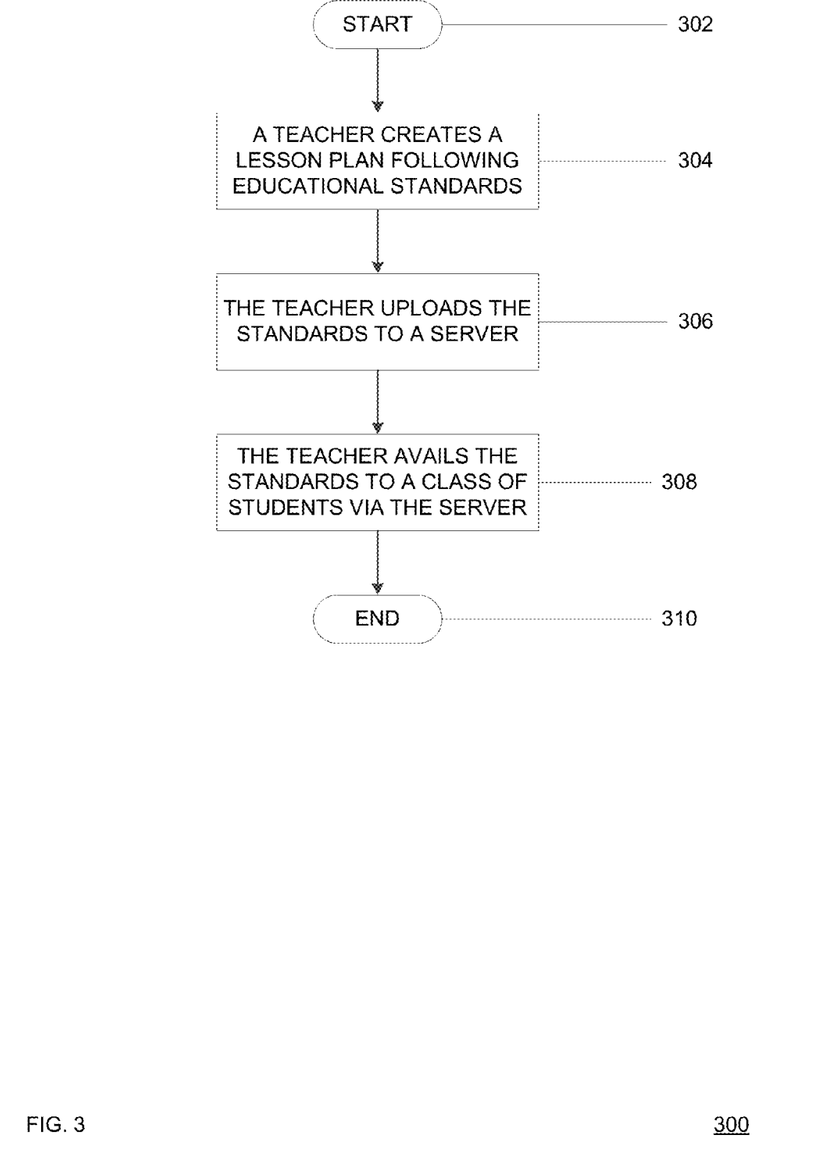
FIG. 3 shows a flowchart of an example embodiment of a process for availing a lesson plan for student evaluation of a teacher according to the present disclosure.

FIG. 3 shows a flowchart of an example embodiment of a process for availing a lesson plan for student evaluation of a teacher according to the present disclosure. A process 300 includes blocks 302-310.

In block 302, process 300 starts.

In block 304, a teacher creates a lesson plan following educational standards. Alternatively, the components and/or the standards define the plan. The creation can be performed on any computer, whether accessible privately, publicly or at work. Some examples of such computers include desktops, workstations, laptops, tablet computers, mobile phones, kiosk computers and so forth. The plan can be created via word processing software, presentation software, teaching software and so forth. At least a portion of the plan can be static or dynamic. At least a portion of the plan can include multimedia, such as a video segment or an audio segment.

In block 306, the teacher uploads the standards to a server. The teacher accesses the server, such as via providing identifying textual information, biometrics or any other access control method, and uploads the file from the computer. The file can also include the plan. The accessing can be by providing identifying information to the server for identity validation. The accessing can be performed via a browser, a mobile app or any other application capable or configured to access the server. Alternatively, the teacher can access the server and create the plan via the server, whether as stored on the server or in another location.

In block 308, the teachers avails the standards to a class of students via the server. The teacher can avail the standards in multiple ways, such as via sharing, which can be any form of access control granted to at least one student of the teacher to at least view a portion of the standard. Some examples of the sharing include email, text messaging, social network sharing, inter-app sharing and so forth.

In block 310, process 300 ends.

Figure 4:
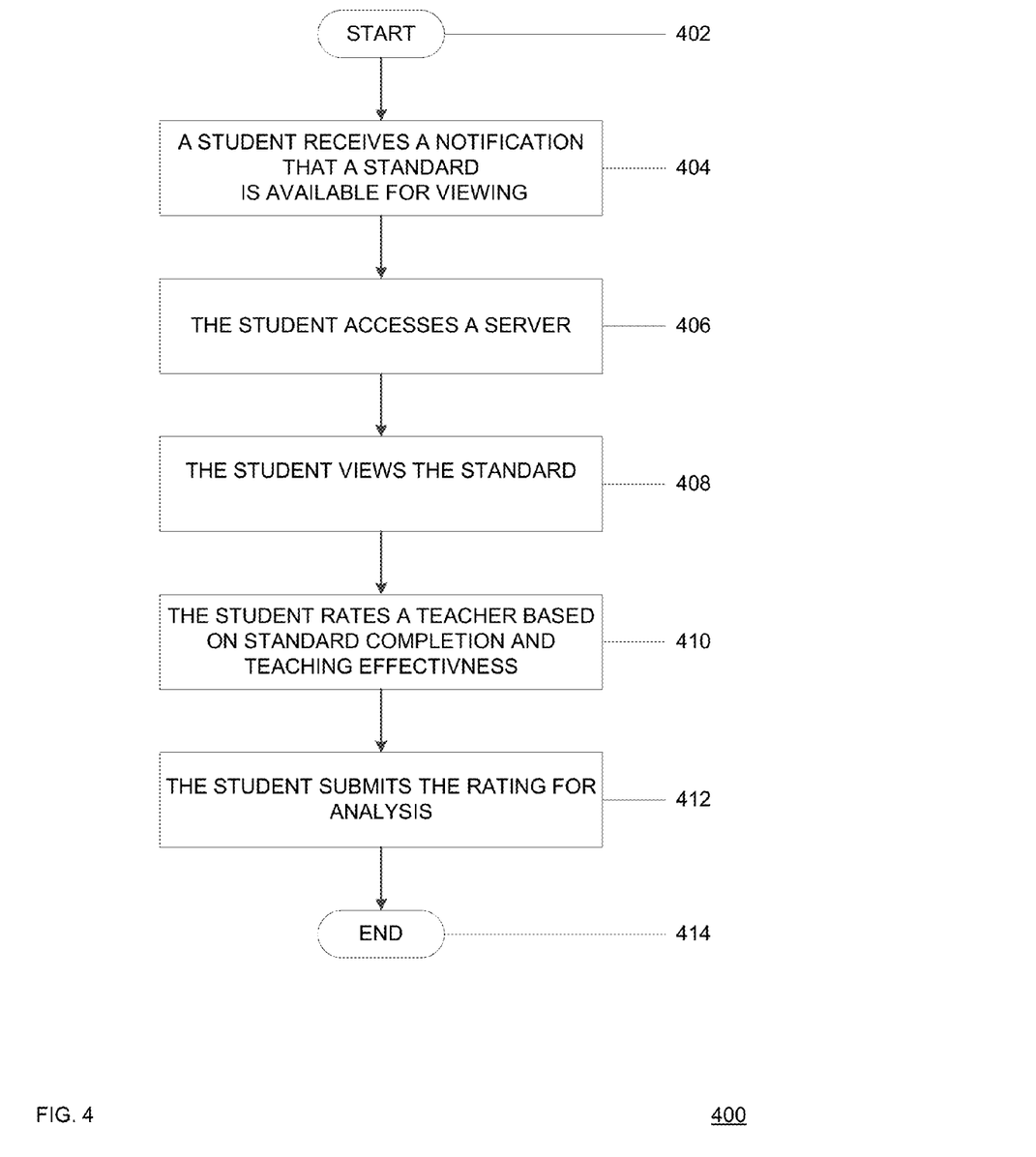
FIG. 4 shows a flowchart of an example embodiment of a process for evaluating a teacher according to the present disclosure.

FIG. 4 shows a flowchart of an example embodiment of a process for evaluating a teacher according to the present disclosure. A process 400 includes blocks 402-414.

In block 402, process 400 starts.

In block 404, a student receives a notification that a standard is available for viewing. The notification can be a message, such as an email message, a text message, a voicemail message, a fax message, a chat message, an oral indication from the teacher, an app message and so forth. The notification can be for remote viewing or for downloading the standard and then viewing the standard. Alternatively, the student lacks the notification and performance of block 404 can be omitted.

In block 406, the student accesses the server. The accessing can be done via a computing device, whether available publicly, privately or for personal use. Some examples of the device are a desktop, a laptop, a tablet computer, a mobile phone and so forth. The accessing can be by providing identifying information to the server for identity validation. The information can be login names, passwords, biometrics and the like. The accessing can be performed via a browser, a mobile app or any other application capable or configured to access the server. When the student lacks the notification, student can just access the server, sua sponte. The server can allow for anonymous or unidentifiable access.

In block 408, the student views the standard. The viewing can be remotely viewing without downloading the standard or downloading the standard and then viewing the standard. The viewing can be done via a browser, a mobile app or any other application capable or configured to access the server.

In block 410, the student rates a teacher based on standard completion and teaching effectiveness. Whether initiated by the teacher, such as upon completion of the class, the server, such as via a class end as programmed in the server via a predefined class schedule, or the students, such as via accessing the server, the server displays a rating system, such as a rating scale, a Likert scale, a 1-10 scale, a color scale, a questionnaire, a bubble form, a slider scale or any other functional equivalents thereof. The rating system allows for the students to rate the teacher according to the standards corresponding to the class, as actually taught by the teacher. Although the server can employ one type of rating system, any permutations of different rating systems can also be used for different classes, teachers or students.

The rating is performed on standard completion, such as whether a teacher actually taught every standard, as availed to and viewed by the students. The rating is also performed on teaching effectiveness of the standards, such as how effective was the teacher's presentation in actual teaching of the standards and conveying educational concepts relating to the standards. For example, when the rating system is a Likert scale, then the students can be presented with choices, such as "The teacher covered all standards", "The teacher covered some of the standards," "The teacher did not cover any of the standards" and "The teacher covered all standard, but I am still unclear about some of the standards." Also for example, when the rating system is a Likert scale, then the students can be presented with choices for each standard, such as "The teacher covered this standard," "The teacher partially covered this standard," "The teacher did not cover this standard" and "The teacher covered this standard, but I am still unclear about this standard." Another example choice that can be presented is "I choose not to learn today." Other types of questions and items can also be used in order to elicit students' responses as to rating the teacher on standard completion and teaching effectiveness of the standards. For example, a choice presented to a student can be "Mr. X taught addition well."

In block 412, the student submits the rating for analysis. The submission can occur automatically, such as when a student completes the rating, or manually, such as when a student activates a GUI element, like a button or a hyperlink, to submit the rating. Also, the students can leave comments with the ratings, whether for one or all standards.

In block 414, process 400 ends.

Figure 5:
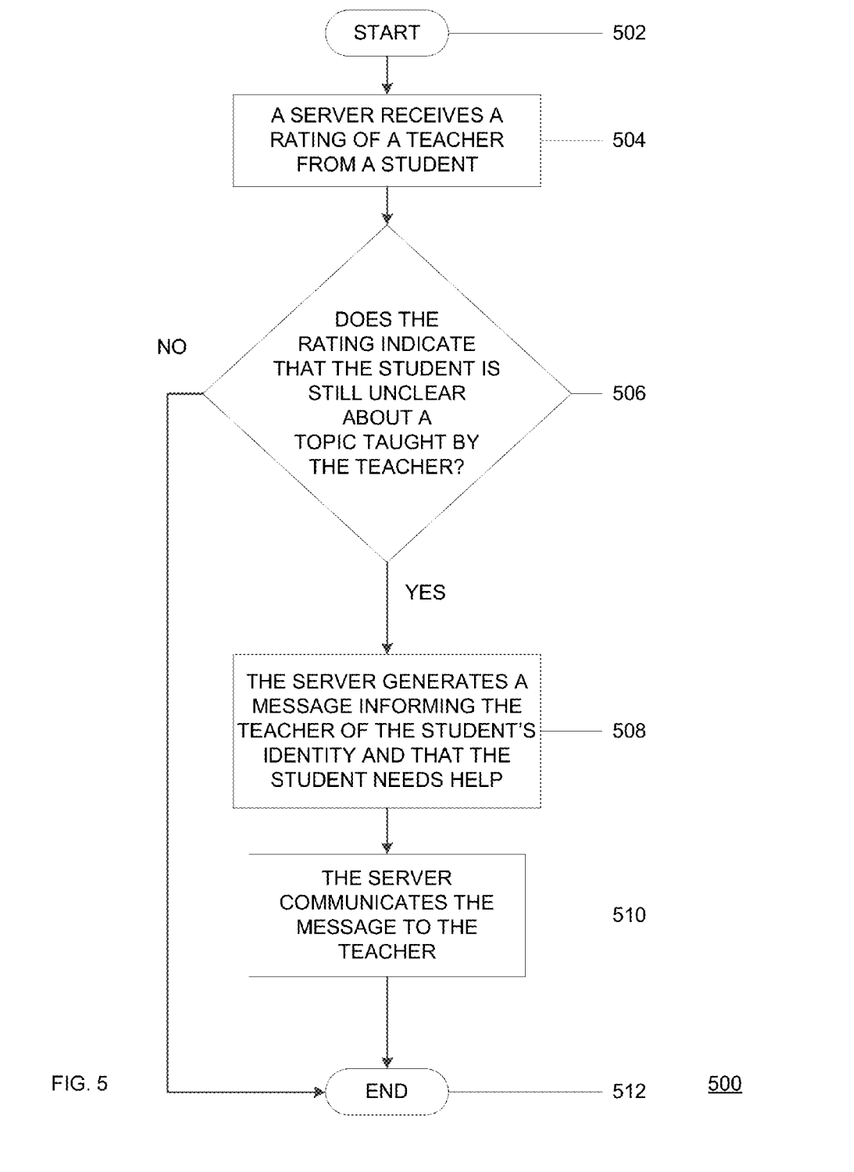
FIG. 5 shows a flowchart of an example embodiment of a process for sending a message to a teacher according to the present disclosure.

FIG. 5 shows a flowchart of an example embodiment of a process for sending a message to a teacher according to the present disclosure. A process 500 includes block 502-512.

In block 502, process 500 starts.

In block 504, a server receives a rating of a teacher from a student. The receipt can be wired or wireless and direct and indirect.

In block 506, the server, as operated by a software application running on the server, makes a determination whether the rating indicates that the student is still unclear about a topic taught by the teacher. If yes, then process 500 continues to block 508. If no, then process 500 continuous to block 512. The extent of student being unclear can vary from being a little unclear to complete incomprehension. The topic can be related to or correspond to one or more of the standards. The rating can include a comment.

In block 508, the server generates a message informing the teacher of the student's identity and that the student needs help. The message can be a template message, as set in advance, or generated using artificial intelligence using various factors in generating the message, such as humor, topic subject matter, date, rating and so forth. The content of the messages can generally be similar for some or all teachers when more than one teacher uses the system or vary for some or all teachers. The message can specify what topic or what component or portion of the lesson plan the student needs help with.

In block 510, the server communicates and/or facilitates communication of the message to the teacher. The message can be an email message, a text message, a voicemail message, a fax message, a chat message, an app message and so forth. The method of communication can be preset by the teacher in advance. The communication can be wired or wireless, direct or indirect, via any communication protocol.

In block 512, process 500 ends.

Figure 6:
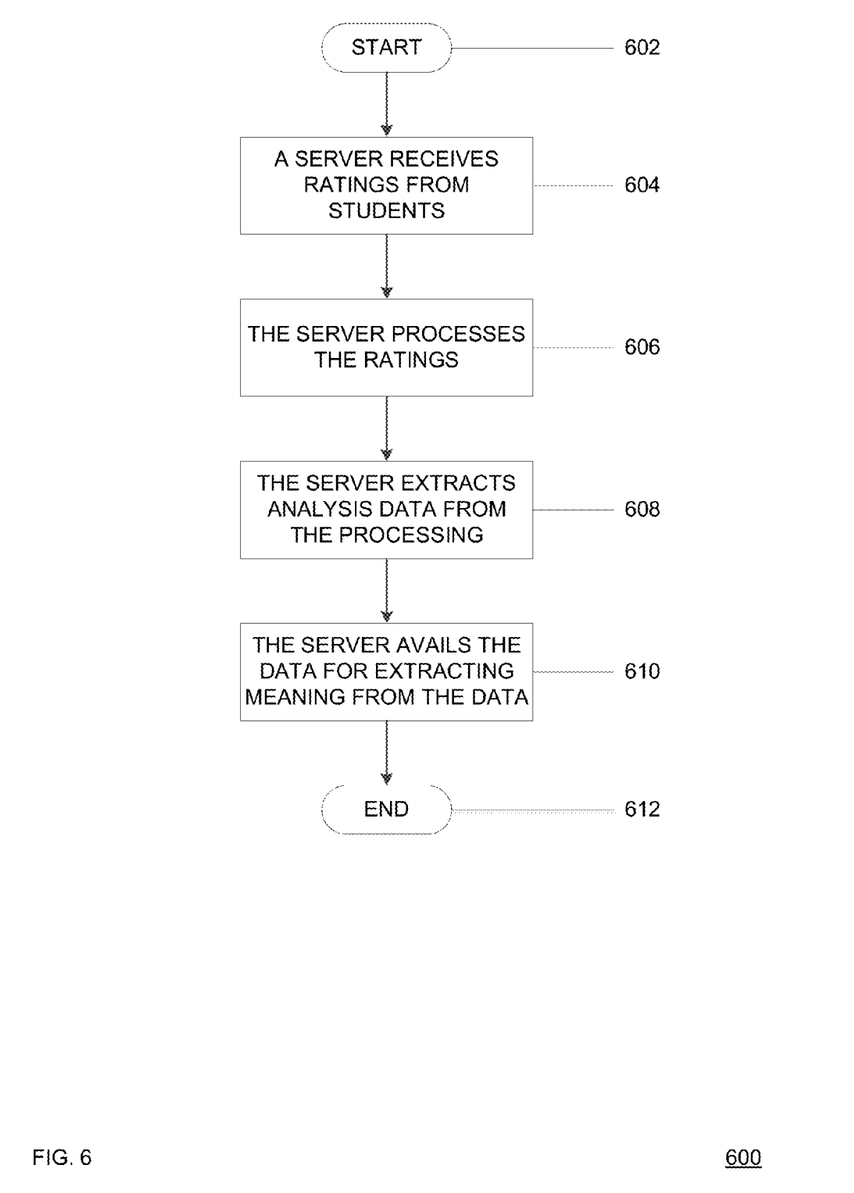
FIG. 6 shows a flowchart of an example embodiment of a process for evaluation data analysis according to the present disclosure.

FIG. 6 shows a flowchart of an example embodiment of a process for evaluation data analysis according to the present disclosure. A process 600 includes blocks 602-612.

In block 602, process 600 starts.

In block 604, the server receives ratings from students. The ratings can be received in realtime, serially, concurrently and/or sequentially. The ratings can be received directly or indirectly. The ratings can be received via a wired connection or wireless connection. The ratings can be received via a software application, whether running on the server or remotely. The ratings can be received from another computing device, such as a desktop, a workstation, a server, a laptop, a tablet computer, a mobile phone and so forth.

In block 606, the server processes the ratings. The processing is done as known in the art. For example, the processing can include creating a data structure, such as a table, storing a list of students with their ratings for a teacher.

In block 608, the server extracts analysis data from the processing. The extracting is done as known in the art. For example, the extracting can include creating a chart or a table indicating what topics, such as components and/or standards, the students think the teacher explained well and which the teacher did not explain well. Also for example, the extracting can include creating a chart or a table indicating what topics, such as components and/or standards, the students believe the teacher did not cover.

In block 610, the server avails the data for extracting meaning from the data. The availing can be done as known in the art. The availing can be different for teachers and for administration. For teachers, the data is anonymous with respect to the students' identities. For self-reflection, student skill determination and teaching strategy, the teacher can identify what topics, components, standards and methods of teaching are effective and ineffective for student learning. For the administration, the data is not anonymous. The administration can learn what topics, components, standards, methods of teaching are effective and ineffective for student learning. Also, the administration can create a strategy for the teacher if the data indicates that certain topics, standards or components are deemed ineffective by the students. Moreover, the administration can benchmark teachers and students to see what the students have learned and mastered and what other materials the teachers need to cover and in what manner. Additionally, the administrators can evaluate the teachers when administrators are not actually in the classrooms since information and feedback that the students provide about the manner in which the standards are or are not covered can prove to be vital when evaluating the effectiveness of the teachers. In addition, the administration can intervene thereby allowing the administrators to monitor the teachers' progress based on the opinions of their students. For example, if an administrator sees a particular issue from the rating, the administrator can analyze the data based on a lesson, hourly, daily, weekly, monthly, mid-marking period, marking period, semester or yearly basis, which can even be via realtime. Also, the administrator can utilize such data to notice when a teacher might need additional help in reaching their students in regards to the standards and can as a result increase further observations or even professional improvement plans if need be. Moreover, the administration can use the data as a tool in which to interpret student mastery of standards, which can result in higher standardized test scores. Further, the administrators, who use the system, can get a better grasp of what standards the teachers are actually teaching in their classrooms and to what extent the teachers are doing such. Additionally, the administration amend or can request that teaching standards be amended for more effective student learning.

In block 6, process 600 ends.

Figure 7:
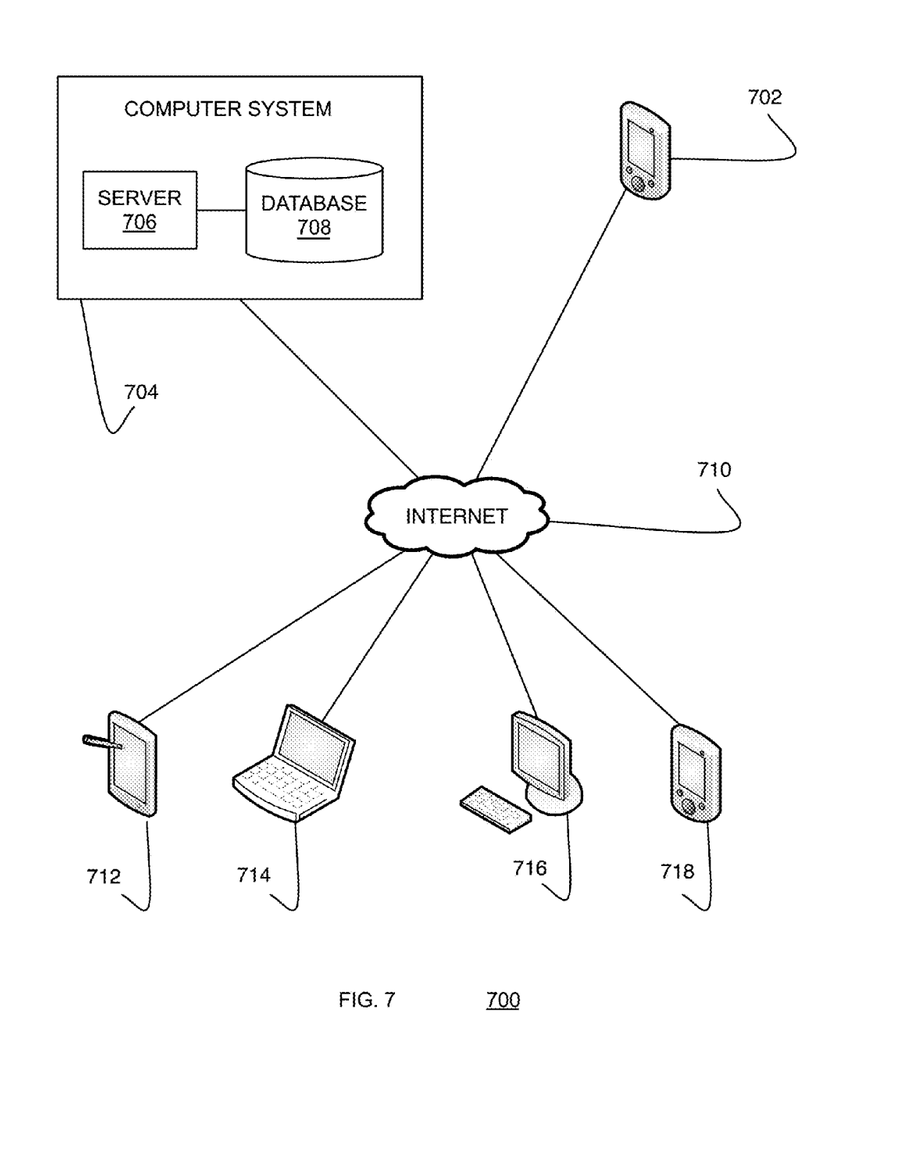
FIG. 7 shows an example embodiment of a network environment according to the present disclosure.

FIG. 7 shows an example embodiment of a network environment according to the present disclosure. A network environment 700 includes a plurality of computing devices 702, 712, 714, 716, 718 and a computer system 704 connected to a network, such as Internet 710. The connections can be wired or wireless. The connections can be direct or indirect. Computer system 704 includes a server 706 operably coupled to a database 708. Server 706 can be a physical or a virtual server. Database 706 can be a relational database. Server 706 runs a software application operably coupled to database 706. Other network configured as known in the art can also be implemented.

In one mode of operation, a teacher operates device 702, an entity, such as a corporation, operates system 704 and students operate devices 712, 714, 716, 718. Via device 702, the teacher creates a lesson plan following educational standards for a lesson before a lesson. The plan is for the lesson to be taught by the teacher to the students. Via device 702, the teacher accesses system 704 where the teacher connects to the application on server 706 and uploads the plan with the standards for storage in database 708. Via the application, the teacher avails the standards to the students, such as via sharing. Via devices 712, 714, 716, 718, the students are notified that the standards are available for viewing. The notifications can be via email, text messages, chat, a social network and so forth. The notifications can be sent from system 704. Alternatively, devices 712, 714, 716, 718 runs mobile apps in communication with system 704 and the notifications are communicated to the apps.

Before the lesson, via devices 712, 714, 716, 718, the students view, whether locally or remotely, the standards or at least portions of the standards. Alternatively, via devices 712, 714, 716, 718, the students view the standards after the lesson.

After the lesson, via devices 712, 714, 716, 718, the students rate the teacher on standard completion and teaching effectiveness of concepts mandated by the standards. Via devices 712, 714, 716, 718, the students submit their ratings to system 704 where the ratings are stored in database 704. Via server 706, the entity processes the ratings, extracts analysis data from the processing and avails the analysis data for extracting meaning from the analysis data. The analysis data can be availed to school administrators, supervisors and so forth, who access system 704.

When one of the ratings indicates that the student is still unclear about some of the taught material, then system 704 generates a message informing of the student's identity and stating that the identified student needs additional help with the already taught material. The message is then communicated from system 704 to device 702. Connections, as described herein, can include all direct and/or indirect types of communicative communication, whether wired, wirelessly, over a network, via a bus or any other computer structure. Also, connecting elements can permit for indirect connection.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of programming languages include HTML5, Flash and other similar languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams, as disclosed herein, illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated. The flow diagrams depicted herein are just one example. There may be many variations to this diagram or the steps (or operations) described therein without departing from the spirit of the disclosure. For instance, the steps may be performed in a differing order or steps may be added, deleted or modified. All of these variations are considered a part of the claimed disclosure. While the preferred embodiment to the disclosure had been described, skilled artisans, both now and in the future, may make various improvements and/or enhancements which fall within the scope of the claims which follow. These claims should be construed to maintain the proper protection for the disclosure first described.

What is claimed is:

1. A method comprising:
    availing a plurality of educational standards to a plurality of students, wherein said standards correspond to a plurality of lessons to be at least partially taught via a plurality of teachers to said students, wherein said availing comprises
        receiving, by an evaluation server, an educational standard and a lesson plan from a teacher client over a network,
        storing, by said evaluation server, said educational standard and said lesson plan in a database coupled to said evaluation server,
        receiving, by said evaluation server, an educational standard selection and a lesson plan selection from said teacher client over said network, wherein said educational standard selection selects said educational standard stored in said database, wherein said lesson plan selection selects said lesson plan stored in said database,
        assigning, by said evaluation server, said educational standard to said lesson plan in said database based on said educational standard selection and said lesson plan selection,
        receiving, by said evaluation server, an input from a student client over said network, wherein said input is indicative of at least one of a teacher, a class, or a location of a class,
        presenting, by said evaluation server, said educational standard and said lesson plan on said student client over said network based on said input and said assigning;
    receiving a plurality of ratings from said students, wherein said ratings rating said teachers based at least in part on said students perceptions of said teachers at least partially teaching said lessons according to said standards, wherein said receiving is based on
        presenting, by said evaluation server, a binary rating scale on said student client over said network based on said presenting said educational standard and said lesson plan on said student client, receiving, by said evaluation server, a rating from said student client over said network based on said binary rating scale, storing, by said evaluation server, said rating in said database such that said rating is associated with said educational standard and said lesson plan, wherein said rating is anonymous to said teacher client based on said evaluation server not revealing a student identity associated with said student client to said teacher client, wherein said rating is not anonymous to an administrator client based on said evaluation server revealing said student identity to said administrator client;

extracting a meaning from said ratings, wherein the extracting comprises correlating, by said evaluation server, a test score with said rating associated with said educational standard and said lesson plan, wherein said test score is stored in said database, providing, by said evaluation server, a notice to said administrator client over said network based on said correlating.

2. The method of claim 1, further comprising:

revealing, by said evaluation server, said student identity to said teacher client based on said rating being negative.

3. The method of claim 1, further comprising:

sending, by said evaluation server, a notification to said student client, wherein said notification is informative of said educational standard being assigned to said lesson plan and available for viewing via said student client, wherein said sending is responsive to said assigning.

4. The method of claim 1, further comprising:

receiving, by said evaluation server, a comment from said student client, wherein said comment is associated with said rating, wherein said rating and said comment are received contemporaneously.

5. The method of claim 4, wherein said comment is anonymous to said teacher client in accordance with said rating.

6. The method of claim 5, wherein said comment is not anonymous to said teacher client when said rating is negative.

7. A method comprising:

receiving, by an evaluation server, an educational standard and a lesson plan from a teacher client over a network;

storing, by said evaluation server, said educational standard and said lesson plan in a database coupled to said evaluation server, wherein said database stores a student schedule;

receiving, by said evaluation server, an educational standard selection and a lesson plan selection from said teacher client over said network, wherein said educational standard selection selects said educational standard stored in said database, wherein said lesson plan selection selects said lesson plan stored in said database;

assigning, by said evaluation server, said educational standard to said lesson plan in said database based on said educational standard selection and said lesson plan selection such that said educational standard and said lesson plan are associated with said student schedule;

receiving, by said evaluation server, a student login from a student client over said network;

presenting, by said evaluation server, said educational standard and said lesson plan on said student client over said network based on said student schedule responsive to said receiving said student login;

presenting, by said evaluation server, a Likert rating scale on said student client over said network based on said presenting said educational standard and said lesson plan on said student client;

receiving, by said evaluation server, a rating from said student client over said network based on said Likert rating scale;

storing, by said evaluation server, said rating in said database such that said rating is associated with said educational standard and said lesson plan, wherein said rating is anonymous to said teacher client based on said evaluation server not revealing a student identity associated with said student client to said teacher client, wherein said rating is not anonymous to an administrator client based on said evaluation server revealing said student identity to said administrator client;

correlating, by said evaluation server, a test score with said rating associated with said educational standard and said lesson plan, wherein said test score is stored in said database; and providing, by said evaluation server, a notice to said administrator client over said network based on said correlating.

8. The method of claim 7, further comprising:

revealing, by said evaluation server, said student identity to said teacher client based on said rating being negative.

9. The method of claim 7, further comprising:

sending, by said evaluation server, a notification to said student client, wherein said notification is informative of said educational standard being assigned to said lesson plan and available for viewing via said student client, wherein said sending is responsive to said assigning.

10. The method of claim 7, further comprising:

receiving, by said evaluation server, a comment from said student client, wherein said comment is associated with said rating, wherein said rating and said comment are received contemporaneously.

11. The method of claim 10, wherein said comment is anonymous to said teacher client in accordance with said rating.

12. The method of claim 11, wherein said comment is not anonymous to said teacher client when said rating is negative.

* * * * *